(12) United States Patent
Sano et al.

(10) Patent No.: US 10,025,057 B2
(45) Date of Patent: Jul. 17, 2018

(54) OPTICAL CROSS-CONNECT COMPONENT

(71) Applicant: SUMITOMO ELECTRIC INDUSTRIES, LTD., Osaka-shi, Osaka (JP)

(72) Inventors: Tomomi Sano, Yokohama (JP); Hiroo Kanamori, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/478,371

(22) Filed: Apr. 4, 2017

(65) Prior Publication Data

US 2017/0293093 A1    Oct. 12, 2017

(30) Foreign Application Priority Data

Apr. 7, 2016  (JP) ................................. 2016-077306

(51) Int. Cl.
  *G02B 6/44*  (2006.01)
  *G02B 6/38*  (2006.01)
  *G02B 6/36*  (2006.01)

(52) U.S. Cl.
  CPC ......... *G02B 6/4472* (2013.01); *G02B 6/3672* (2013.01); *G02B 6/3676* (2013.01); *G02B 6/3882* (2013.01); *G02B 6/3885* (2013.01); *G02B 6/4403* (2013.01); *G02B 6/4452* (2013.01)

(58) Field of Classification Search
  None
  See application file for complete search history.

(56) References Cited

U.S. PATENT DOCUMENTS

| | | | | |
|---|---|---|---|---|
| 5,020,871 A * | 6/1991 | Nishimura | ............... | G02B 6/04 385/24 |
| 5,214,730 A * | 5/1993 | Nagasawa | ............ | G02B 6/3821 385/59 |
| 5,583,958 A * | 12/1996 | Yanagawa | ............... | G02B 6/125 385/14 |
| 6,205,278 B1 * | 3/2001 | Sjolinder | ............. | G02B 6/4475 385/100 |
| 6,222,976 B1 * | 4/2001 | Shahid | ................. | G02B 6/3608 385/114 |
| 6,324,325 B1 * | 11/2001 | Booth | ...................... | G02B 6/04 385/114 |

(Continued)

*Primary Examiner* — Mike Stahl
(74) *Attorney, Agent, or Firm* — Drinker Biddle & Reath LLP

(57) ABSTRACT

An optical cross-connect component is disclosed. The optical cross-connect component includes an optical fiber group having m×n optical fibers, one ends and the other ends of the m×n optical fibers being arranged in a matrix of m rows×n columns, a plurality of first connectors housing the one ends of the optical fiber group, and a plurality of second connectors housing the other ends of the optical fiber group. The m×n optical fibers are housed in any of the plurality of first connectors, and one first connector collectively houses therein n optical fibers arranged in at least any one row of the m rows. The m×n optical fibers are housed in any of the plurality of second connectors, and one second connector collectively houses therein m optical fibers arranged in at least any one column of the n columns.

18 Claims, 6 Drawing Sheets

(56) References Cited

U.S. PATENT DOCUMENTS

| | | | |
|---|---|---|---|
| 6,464,404 B1* | 10/2002 | Robinson | G02B 6/04 |
| | | | 385/137 |
| 6,594,437 B1* | 7/2003 | Nicolas | G02B 6/4471 |
| | | | 385/139 |
| 8,768,116 B2 | 7/2014 | McColloch et al. | |
| 9,124,959 B2* | 9/2015 | Xu | H04Q 11/0005 |
| 2002/0168150 A1* | 11/2002 | Shiino | G02B 6/3833 |
| | | | 385/71 |
| 2003/0031449 A1* | 2/2003 | Simmons | G02B 6/3636 |
| | | | 385/134 |
| 2004/0126069 A1* | 7/2004 | Jong | G02B 6/3878 |
| | | | 385/109 |
| 2017/0293092 A1* | 10/2017 | Sano | G02B 6/3885 |

* cited by examiner

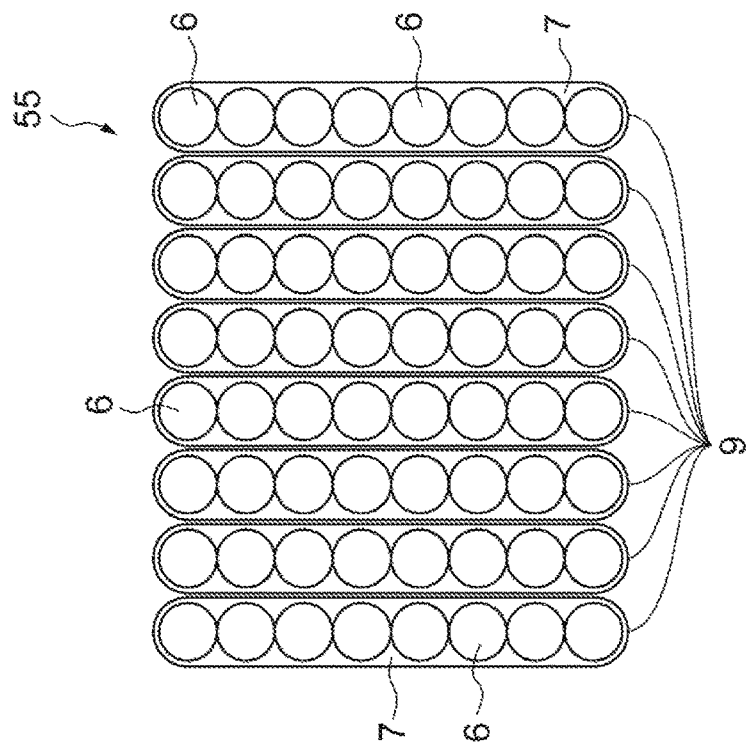
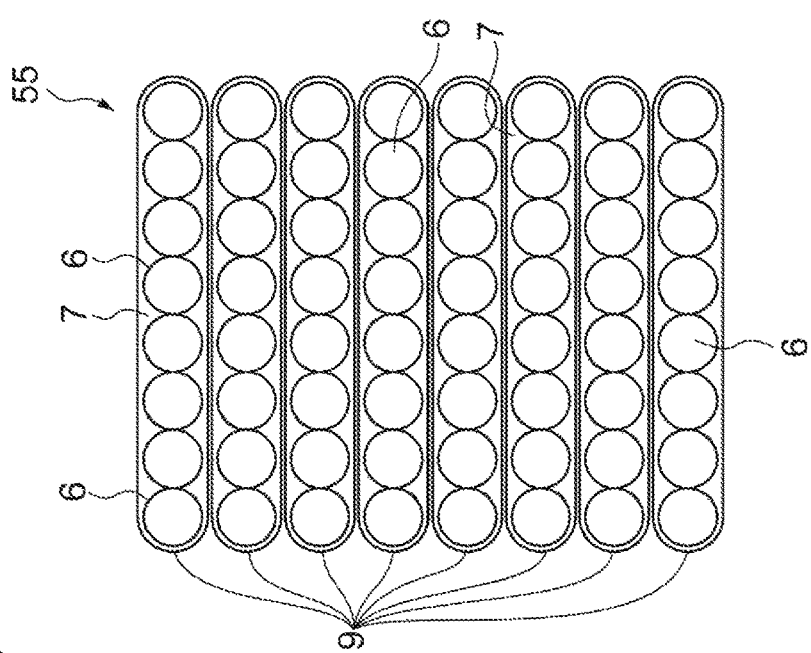

OPTICAL CROSS-CONNECT COMPONENT

CROSS REFERENCE TO RELATED APPLICATIONS

This application is based upon and claims the benefit of priority from Japanese Patent Application No. 2016-077306, filed on Apr. 7, 2016; the entire contents of which are incorporated herein by reference.

TECHNICAL FIELD

The present invention relates to an optical cross-connect component.

BACKGROUND

An optical signal processing device such as a reconfigurable optical add/drop multiplexer (ROADM) has been known in a field of a wavelength division multiplexing (WDM) optical communication. The processing device requires a wiring structure for dividing input WDM signals for each wavelength and collecting respective divided signal components for each wavelength.

U.S. Pat. No. 8,768,116 discloses an optical cross-connect mechanism including a first connector stack stacked in one direction and a second connector stack stacked in another direction orthogonal to the relevant one direction, as the above wiring structure. This mechanism provides a lens to a tip end of each of optical fibers held by the first connector stack and the second connector stack.

SUMMARY

In accordance with one aspect of the invention, an optical cross-connect component includes an optical fiber group having m×n optical fibers, at least one ends and the other ends of the m×n optical fibers being arranged in a matrix of m rows×n columns, wherein m and n each represents an integer equal to or more than two, a plurality of first connectors housing therein the one ends of the optical fiber group, and a plurality of second connectors housing therein the other ends of the optical fiber group. The m×n optical fibers are housed in any of the plurality of first connectors, and one first connector of the plurality of first connectors collectively houses therein n optical fibers arranged in at least any one row of the m rows. The m×n optical fibers are housed in any of the plurality of second connectors, and one second connector of the plurality of second connectors collectively houses therein m optical fibers arranged in at least any one column of the n columns.

BRIEF DESCRIPTION OF THE DRAWINGS

The foregoing and other purposes, aspects and advantages will be better understood from the following detailed description of embodiments of the invention with reference to the drawings, in which:

FIG. 6A is a cross-sectional view showing an optical fiber group of an optical cross-connect component.

FIG. 6B is a cross-sectional view showing an optical fiber group of an optical cross-connect component.

DETAILED DESCRIPTION

Figure 1:
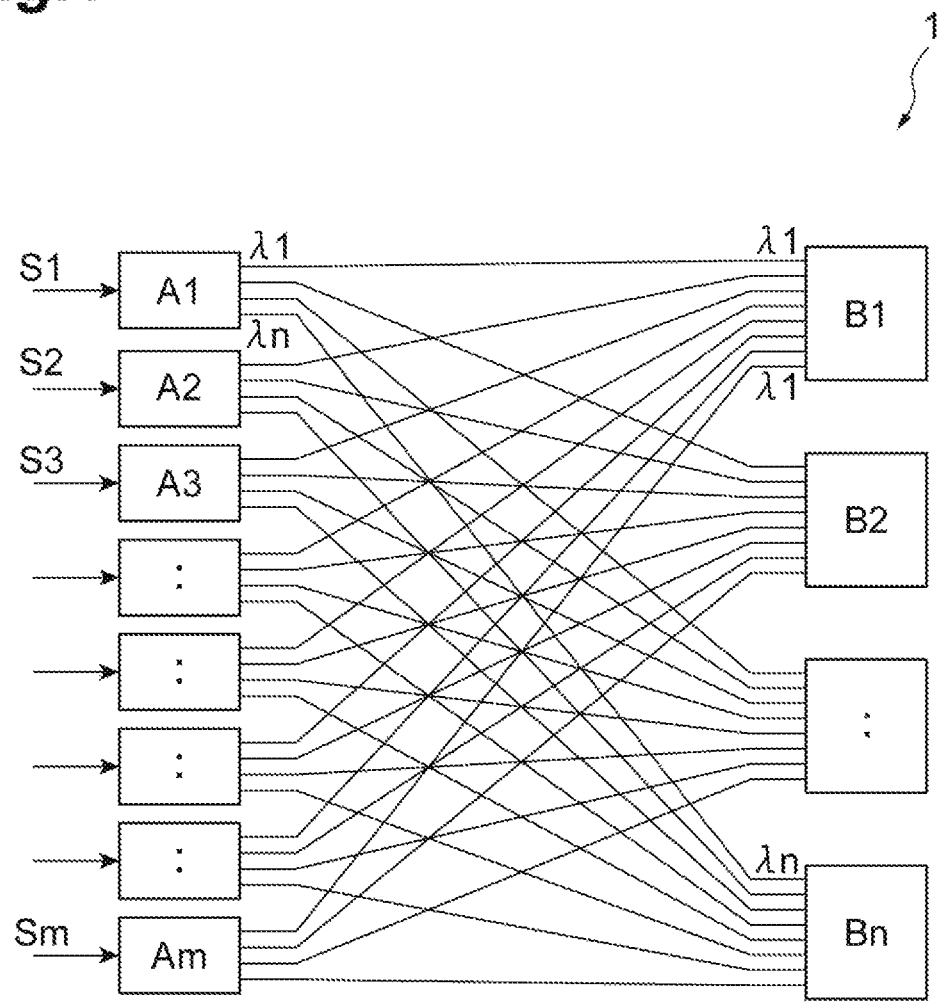
FIG. 1 is a conceptual diagram for illustrating a wiring structure of an optical cross-connect component according to an embodiment.

Description of Embodiment of the Present Application Invention

Content of embodiments of the present invention is listed and described. An optical cross-connect component according to one embodiment of the present invention includes an optical fiber group having m×n optical fibers, at least one ends and the other ends of the m×n (m by n) optical fibers being arranged in a matrix of m rows×n columns, wherein m and n each represents an integer equal to or more than two, a plurality of first connectors housing therein the one ends of the optical fiber group, and a plurality of second connectors housing therein the other ends of the optical fiber group. The m×n optical fibers are housed in any of the plurality of first connectors, and one first connector of the plurality of first connectors collectively houses therein n optical fibers arranged in at least any one row of the m rows. The m×n optical fibers are housed in any of the plurality of second connectors, and one second connector of the plurality of second connectors collectively houses therein in optical fibers arranged in at least any one column of the n columns.

The optical cross-connect component connects one first connector with all the second connectors each other by connecting each of the n optical fibers housed in the one first connector to any of a plurality of second connectors. Each of the second connectors is connected with the optical fibers from each of a plurality of first connectors, and thereby specified signals can be collected from the respective first connectors to one second connector. The optical cross-connect component has a simple configuration that one ends of the optical fiber group are housed in a plurality of first connectors and the other ends of the optical fiber group are housed in a plurality of second connectors, and thereby it does not impair manufacturability.

In the optical cross-connect component according to one aspect, the plurality of first connectors may be constituted by m first connectors, and each of the first connectors may collectively house therein n optical fibers arranged in each row, and the plurality of second connectors may be constituted by n second connectors, and each of the second connectors may collectively house therein m optical fibers arranged in each column.

In the above optical cross-connect component, the n optical fibers housed in the first connector are respectively connected with the second connectors different from each other, and the in optical fibers housed in the second connector are respectively connected with the first connectors different from each other. Consequently, each of the second connectors is connected with one optical fiber from every one of the in first connectors, and thereby specified signals can be collected from the respective first connectors to one second connector. In addition, the optical cross-connect component has a simple configuration that one ends of the optical fiber group are housed in the m first connectors and the other ends are housed in the n second connectors, and thereby it does not impair manufacturability.

In the optical cross-connect component according to one aspect, a pitch of the optical fibers in the row direction and column direction in the optical fiber group may be smaller at a center of the optical fiber group as compared to at one ends and the other ends of the optical fiber group. By making the pitch of the optical fibers be small at the center of the optical fiber group, the optical fiber group can be made compact.

In the optical cross-connect component according to one aspect, the n optical fibers in each row may be formed into a ribbon or the m optical fibers in each column may be formed into a ribbon. The optical fibers arranged in each column or each row are each formed in a ribbon, which makes it easy to arrange the optical fibers in a matrix of m rows×n columns.

In the optical cross-connect component according to one aspect, the optical fibers adjacent to each other may be in contact with each other in the optical fiber group. In this way, by bring the optical fibers into close contact with each other, the optical fiber group can be made compact.

In the optical cross-connect component according to one aspect, each of the first connector and the second connector provides therein at least two guide holes mated with guide pins for connecting with another connector. This makes it possible to easily connect each of the first connector and the second connector with another connector.

In the optical cross-connect component according to one aspect, a diameter of the optical fiber may be equal to or less than 260 μm. This allows the optical fiber group to be made compact.

Detail of Embodiments of the Present Application Invention

Specific examples of the optical cross-connect component according to embodiments of the invention are described below with reference to the drawings. The invention is not limited to the examples, and is intended to include the meanings shown in the Claims and equivalent to the Claims, and all changes in a scope thereof. In the following description, the same components in description of the drawings are designated by the same reference signs, and the duplicated description is omitted.

First Embodiment

A description is given of a basic concept of a wiring structure of the optical cross-connect component according to one aspect. FIG. 1 is a conceptual diagram for illustrating a wiring structure of an optical cross-connect component. As shown in FIG. 1, the optical cross-connect component has m first connectors A1 to Am (m represents an integer equal to or more than two) and n second connectors B1 to Bn (n represents an integer equal to or more than two). Here, for example, n signal components λ1 to λn obtained by dividing, for each wavelength, WDM signals S1 to Sm different from each other are input to the first connectors A1 to Am. In this case, the first connectors A1 to Am and the second connectors B1 to Bn are connected with each other such that the signal components λ1 to λn output from the first connectors A1 to Am are collected into the second connectors B1 to Bn for each wavelength. For example, the signal components λ1 output from the first connectors A1 to Am are all input to the second connector B1. In the embodiment, the first connectors A1 to Am are connected with the second connectors B1 to Bn through the optical fibers, which achieves the above wiring structure.

Figure 2:
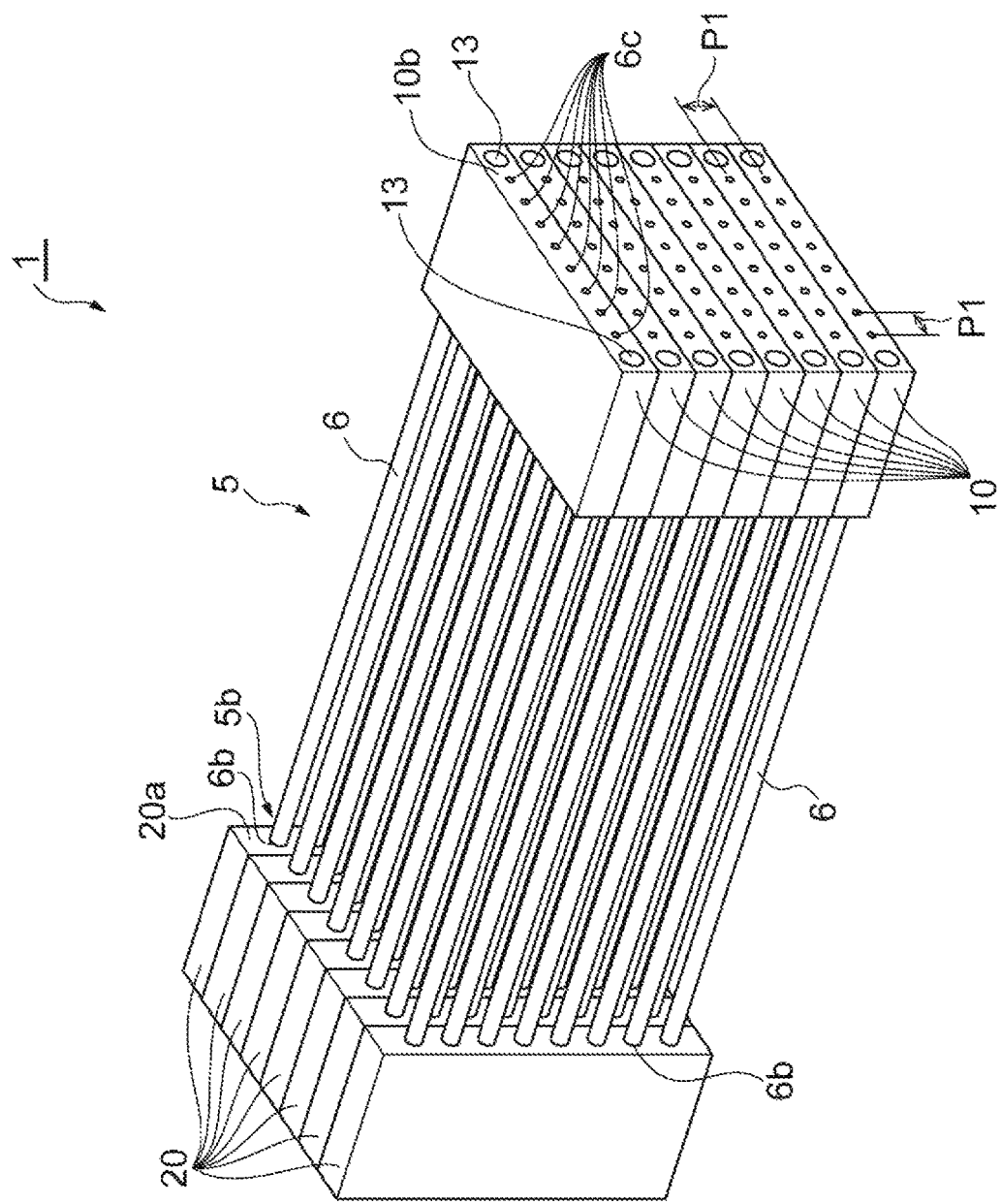
FIG. 2 is a perspective view of an optical cross-connect component seen from a side of one ends.
Figure 3:
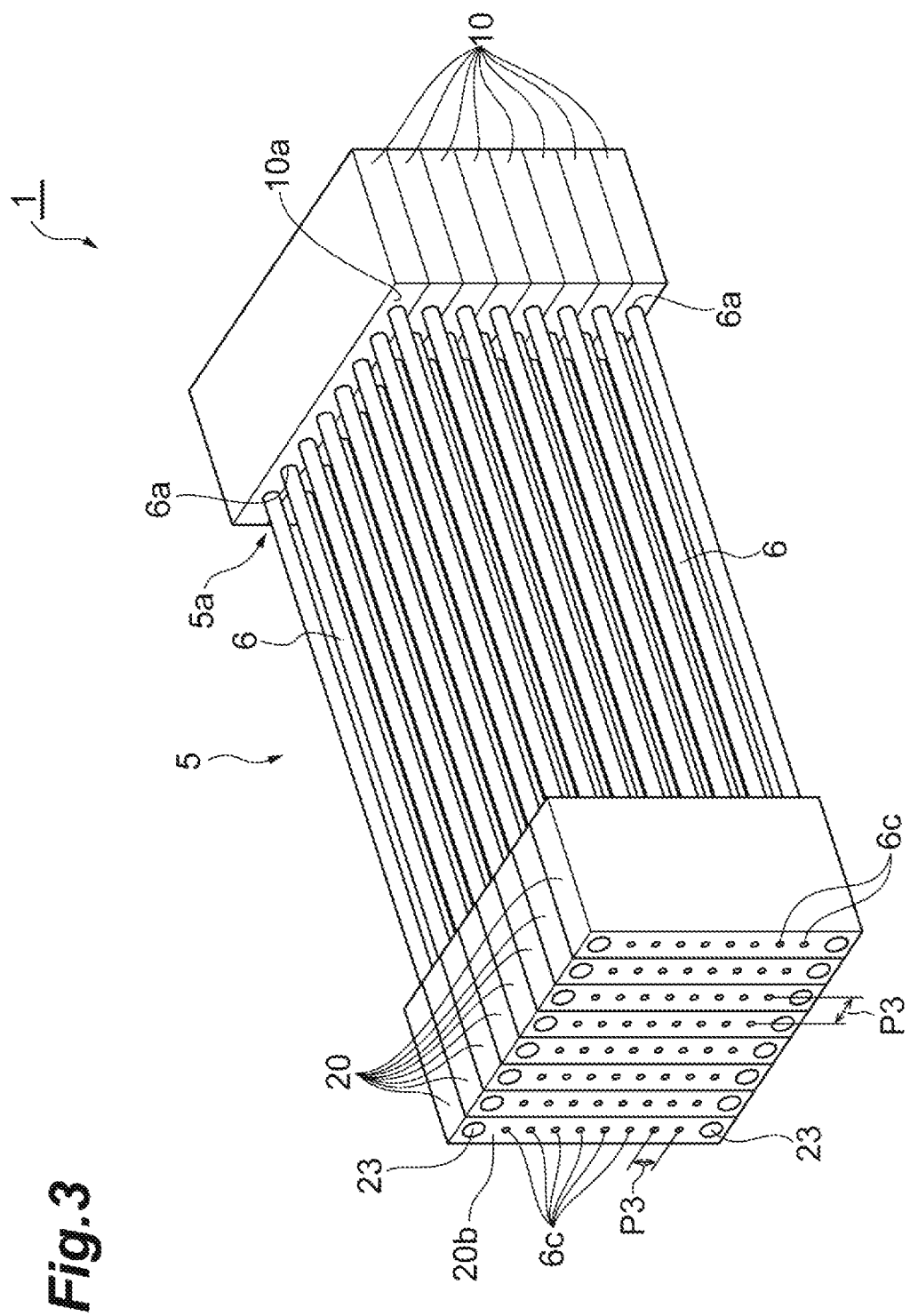
FIG. 3 is a perspective view of the optical cross-connect component seen from a side of the other ends.

Next, a description is given of an example of specific configurations of the optical cross-connect component. FIG. 2 is a perspective view of an optical cross-connect component 1 seen from a side of one ends. FIG. 3 is a perspective view of the optical cross-connect component 1 seen from a side of the other ends. The optical cross-connect component in the embodiment includes an optical fiber group having m×n optical fibers, at least one ends and the other ends of them×n optical fibers being arranged in a matrix of m. rows×n columns, m first connectors, at one ends of the optical fiber group, each collectively housing therein n optical fibers arranged in each row, and n second connectors, at the other ends of the optical fiber group, each collectively housing therein m optical fibers arranged in each column. Hereinafter, a description is given of an example where both m and n are "8 (eight)".

As shown in FIG. 2 and FIG. 3, the optical cross-connect component 1 includes an optical fiber group 5, eight first connectors 10, and eight second connectors 20. The first connectors 10 correspond to the first connectors A1 to A8, and the second connectors 20 correspond to the second connectors B1 to B8. The optical fiber group 5 is constituted by m×n optical fibers, that is, 64 (sixty-four) optical fibers 6. A diameter of the optical fiber 6 is, for example, equal to or less than 260 μm, and is 190 μm to 260 μm as an example. One ends 6a and the other ends 6b of these sixty-four optical fibers 6 in a longitudinal direction are aligned to be in a matrix of 8 rows×8 columns. As shown in FIG. 2 and FIG. 3, not only one ends 6a and the other ends 6b of the optical fibers 6 but also the optical fibers 6 at a center thereof in the longitudinal direction are aligned separately from each other to be in a matrix of 8 rows×8 columns. The optical fibers 6 constituting the optical fiber group 5 may not be separated from each other.

Figure 4:
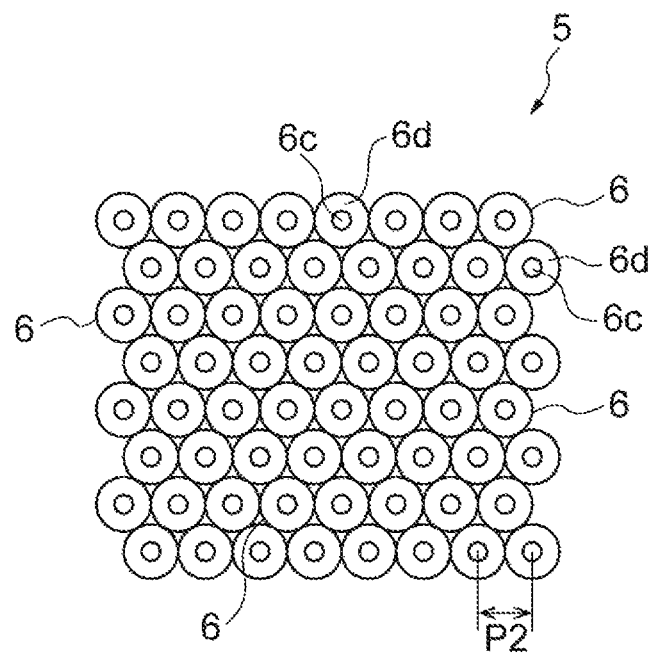
FIG. 4 is a cross-sectional view showing an optical fiber group of the optical cross-connect component.

For example, FIG. 4 is an example of a cross-sectional view of the optical fiber group 5 at the center thereof in the longitudinal direction. As shown in FIG. 4, the optical fiber 6 has a bare optical fiber 6c and a resin coating 6d coating the bare optical fiber 6c. In the optical fiber group 5, the optical fibers 6 adjacent to each other are in contact with each other. In the example shown in FIG. 4, the optical fiber group 5 is made into a bundle in such a manner that one optical fiber 6 and adjacent six optical fibers 6 are brought into contact with each other.

The first connector 10, which is, for example, a ferrule having inside thereof a plurality of parallel optical fiber holding holes, collectively houses eight optical fibers 6 arranged in each row at one ends 5a of the optical fiber group 5. A contour of the first connector 10 is plate-shaped extending in the row direction. The first connector 10 has an end face 10a where the optical fibers 6 are inserted and an end face 10b on an opposite side of the end face 10a. At the ends 6a of the optical fibers 6, the bare optical fibers 6c are exposed by eliminating the resin coatings 6d, and these exposed bare optical fibers 6c are housed in the first connector 10. At the end face 10b the ends of the bare optical fibers 6c housed in the first connector 10 are exposed. For example, the ends of the bare optical fibers 6c may protrude from the end face 10b.

In the embodiment, the exposed bare optical fibers 6c are arranged in the first connector 10 at a constant pitch P1 in the row direction and column direction, for example, in parallel. The "pitch" used herein means a distance between the centers of the optical fibers 6 or bare optical fibers 6c arranged adjacent to each other. In the case where the optical fibers 6 are in contact with each other in the optical fiber group 5 as shown in FIG. 4, the pitch P1 of the bare optical fibers 6c in the first connector 10 is larger than a pitch P2 of the optical fibers 6 in the row direction and column direction in the optical fiber group 5. In other words, the optical fibers 6 constituting the optical fiber group 5 are inserted into the first connector 10 in a state of spreading in the row direction on a side of the one ends 6a thereof. In this case, the pitch of the optical fibers 6 in the row direction in the optical fiber group 5 is smaller at the center in the longitudinal direction of the optical fiber group 5 than at the one ends 5a for the optical fiber group 5.

Guide holes 13 are formed on the end face 10b of the first connector 10. The guide hole 13 may be mated with a guide pin for connecting with another connector. In the embodiment, a pair of guide holes 13 is formed on the end face 10b of the first connector 10 along an optical axis direction. A pair of guide holes 13 is provided at both sides on the end face 10b in the row direction. By doing so, eight bare optical fibers 6c are arranged between a pair of guide holes 13. As shown in FIG. 2 and FIG. 3, eight first connectors 10 arranged in the column direction are in contact with each other, but eight first connectors 10 may be separated from each other.

The second connector 20, which is, for example, a ferrule, collectively houses eight optical fibers 6 arranged in each column at the other ends 5b of the optical fiber group 5. Each one of eight optical fibers 6 arranged in each column is connected with each one of eight first connectors 10. A contour of the second connector 20 is plate-shaped extending in the column direction. The second connector 20 has an end face 20a where the optical fibers 6 are inserted and an end face 20b on an opposite side of the end face 20a. At the other ends 6b of the optical fibers 6, the bare optical fibers 6c are exposed by eliminating the resin coatings 6d, and these exposed bare optical fibers 6c are housed in the second connector 20. At the end face 20b, the ends of the bare optical fibers 6c housed in the second connector 20 are exposed. For example, the ends of the bare optical fibers 6c may protrude from the end face 20b.

In the embodiment, the exposed bare optical fibers 6c are arranged in the second connector 20 at a constant pitch P3 in the row direction and column direction, for example, in parallel. In the case where the optical fibers 6 are in contact with each other in the optical fiber group 5 as shown in FIG. 4, the pitch P3 of the bare optical fibers 6c in the second connector 20 is larger than the pitch P2 of the optical fibers 6 in the row direction and column direction in the optical fiber group 5. In other words, the optical fibers 6 constituting the optical fiber group 5 are inserted into the second connector 20 in a state of spreading in the column direction on a side of the other ends 6b thereof. In this case, the pitch of the optical fibers 6 in the column direction in the optical fiber group 5 is smaller at the center in the longitudinal direction of the optical fiber group 5 than at the other ends 5b for the optical fiber group 5.

Guide holes 23 are formed on the end face 20b of the second connector 20. The guide hole 23 may be mated with a guide pin for connecting with another connector. In the embodiment, a pair of guide holes 23 is formed on the end face 20b of the second connector 20 along an optical axis direction. A pair of guide holes 23 is provided at both sides on the end face 20b in the column direction. By doing so, eight bare optical fibers 6c are arranged between the pair of guide holes 23. As shown in FIG. 2 and FIG. 3, eight second connectors 20 arranged in the row direction are in contact with each other, but eight second connectors 20 may be separated from each other.

In the optical cross-connect component 1 described above, eight optical fibers 6 housed in one first connector 10 are respectively connected with the second connectors 20 different from each other, and eight optical fibers 6 housed in one second connector 20 are respectively connected with the first connectors 10 different from each other. Each of the second connectors 20 is connected with one optical fiber 6 from every one of eight first connectors 10, and thereby specified signals can be collected from the respective first connectors 10 to one second connector 20. In addition, the optical cross-connect component 1 has a simple configuration that one ends for the optical fiber group 5 are housed in eight first connectors 10 and the other ends are housed in eight second connectors 20, and thereby it does not impair manufacturability.

In the optical cross-connect component 1, the pitch of the optical fibers 6 in the row direction and column direction in the optical fiber group 5 may be configured to be small at the center of the optical fiber group 5 as compared to at one ends and the other ends of the optical fiber group 5. This configuration makes the pitch of the optical fibers 6 be smaller at the center in the longitudinal direction of the optical fiber group 5, and thereby the optical fiber group 5 can be made compact.

In the optical fiber group 5, the optical fibers 6 adjacent to each other may be configured to be in contact with each other. This configuration brings the optical fibers 6 into close contact with each other, and thereby the optical fiber group 5 can be made compact.

In the optical cross-connect component 1, on the first connector 10 and the second connector 20, the guide holes 13 and 23 each mated with the guide pin for connecting with another connector are formed on at least two positions for each. This makes it possible to easily connect each of the first connector 10 and the second connector 20 with another connector.

In the optical cross-connect component 1, a diameter of the optical fiber 6 is equal to or less than 260 µm. This allows the optical fiber group 5 to be made compact.

Second Embodiment

An optical cross-connect component 101 according to the second embodiment is different from the optical cross-connect component 1 of the first embodiment in that the first connector and the second connector collectively house the optical fibers arranged in a plurality of rows or a plurality of columns. Hereinafter, a description is mainly given of the difference from the first embodiment, and the same component or member is designated by the same reference sign and the detailed description thereof is omitted. In this embodiment, a description is given of an example where both m and n are "eight" similarly to the first embodiment.

Figure 5:
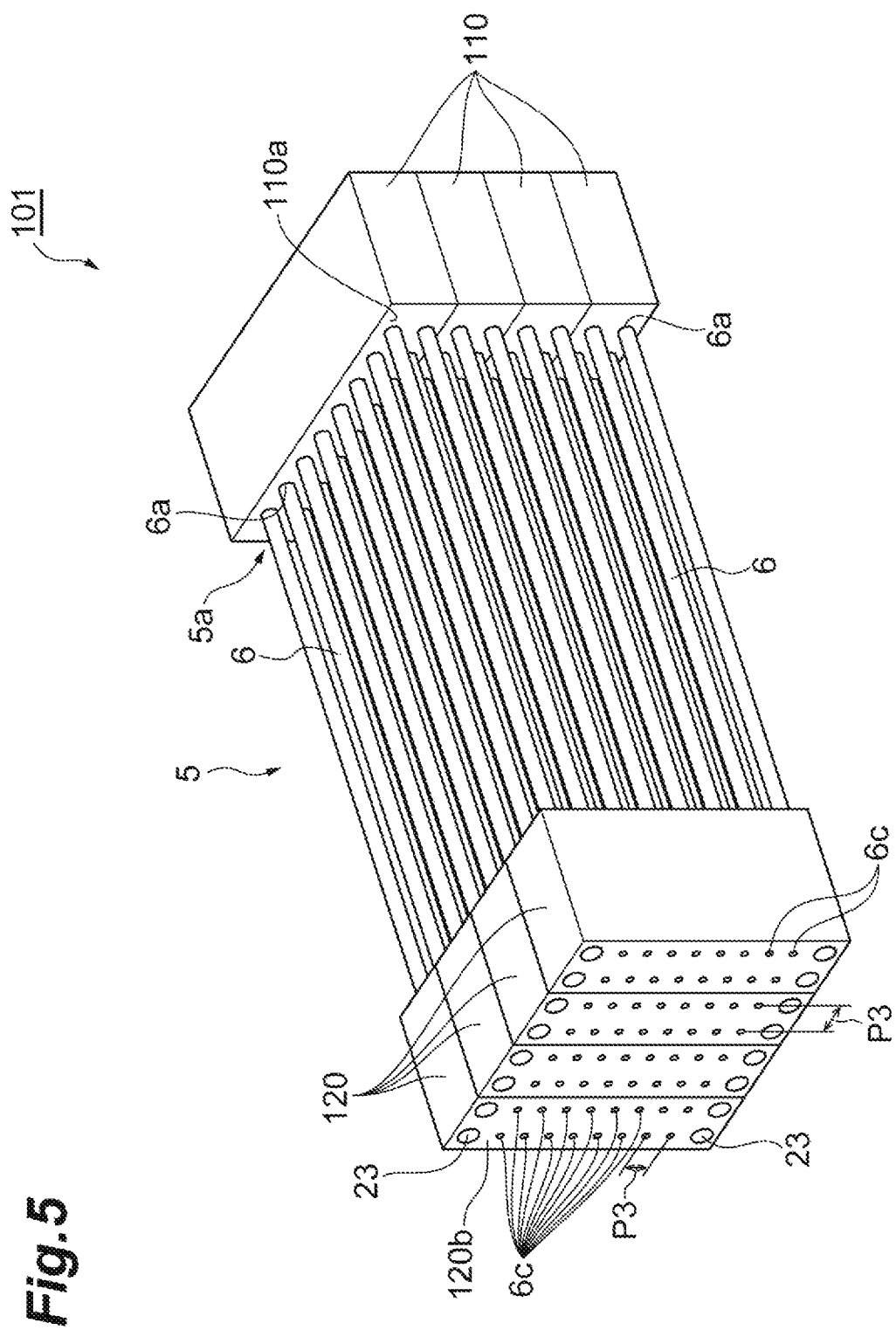
FIG. 5 is a perspective view of an optical cross-connect component seen from a side of one ends according to another embodiment.

As shown in FIG. 5, the optical cross-connect component 101 includes the optical fiber group 5, four first connectors 110, and four second connectors 120. The second connector 120 collectively houses eight optical fibers 6 arranged in each column at the other ends 5b of the optical fiber group 5. The optical fibers 6 the number of which is sixteen in total, that is, eight optical fibers arranged in each of two columns, are housed in each of four second connectors 120. At an end face 120b of the second connector 120, the ends of the bare optical fibers 6c housed in the second connector 120 are exposed. In the example shown in FIG. 5, two guide holes 23 are formed on both end sides for each connector in the column direction.

Similarly, each the first connector 110, which has an end face 110a where the optical fibers 6 are inserted at the one ends 5a of the optical fiber group 5, collectively houses at least eight optical fibers 6 arranged in one row. In the example shown in FIG. 5, the optical fibers 6 the number of which is sixteen in total, that is, eight optical fibers arranged in each of two rows, are housed in each of four first connectors 110. In place of four first connectors 110, the optical fibers 6 may be housed in eight first connectors 10 described in the first embodiment.

Hereinbefore, the embodiments of the present invention are described in detail with reference to the drawings, but the specific configuration is not limited to these embodiments.

For example, as shown in FIG. 2 and FIG. 3, the examples are shown in which the optical fibers 6 constituting the optical fiber group 5 are separated from each other, and as shown in FIG. 4, the example is shown in which the optical fibers 6 adjacent to each other constituting the optical fiber group 5 are in contact with each other, but there is no limitation thereto. FIG. 6A and FIG. 6B each are a cross-sectional view showing an optical fiber group 55 of the optical cross-connect component 1 according to a modification example. As shown in FIG. 6A, eight optical fibers 6 in each row may be formed into a ribbon. Additionally, as shown in FIG. 6B, 8 optical fibers 6 in each column may be formed into a ribbon. In these cases, at least one ends of the optical fibers 6 in an optical axis direction may be formed into a ribbon. In other words, portions of the optical fibers 6 near at least first connector 10 or second connector 20 may be formed into a ribbon.

In these examples, a ribbon optical fiber 9 which is coated by a coating material 7 such as an ultraviolet curable resin in a state where eight optical fibers 6 are aligned in one array is laminated in the row direction or column direction. In the example shown in FIG. 6A and FIG. 6B, the optical fibers 6 adjacent to each other are in contact with each other. In FIG. 6A, eight ribbon optical fibers 9 may be laminated in the column direction. In the example shown in FIG. 6B, eight ribbon optical fibers 9 may be laminated in the row direction. The optical fibers 6 arranged in each column or each row are formed into a ribbon as described above, which makes it easy to arrange the optical fibers 6 in a matrix of 8 rows×8 columns, and thereby such configuration improves manufacturing efficiency.

In these examples, for example, two or four optical fibers may be formed into a ribbon in each row or each column, and a plurality of kinds of these ribbon optical fibers may mixedly exist. Moreover, the all optical fibers in one row or one column may not necessarily be formed into a ribbon, and a part of the optical fibers in the relevant one row or one column may be formed into a ribbon. Further, the optical fibers included in a part of the rows or columns in the respective rows or respective columns may be formed into a ribbon. A plurality of optical fibers aligned in the row direction or column direction may be integrally coated by a coating material such as an ultraviolet curable resin to be formed into a ribbon optical fiber.

The guide holes may be formed at least two positions on the first connector and the second connector, and may be formed at three or more positions.

The example is shown where the value of m and the value of n are the same value "eight", but there is no limitation thereto. The value of m and the value of n may be different from each other, and may be a desired value such as "sixteen" or "thirty-two", so long as it is an integer equal to or more than two. For example, in a case where the value of m is "sixteen" and the value of n is "thirty-two", the optical fiber group has 512 optical fibers arranged in a matrix of 16 rows×32 columns. Moreover, each of sixteen first connectors houses thirty-two optical fibers arranged in each row. Further, each of thirty-two second connectors houses sixteen optical fibers arranged in each column.

What is claimed is:

1. An optical cross-connect component comprising:
an optical fiber group having m×n optical fibers, wherein m and n each represents an integer equal to or more than two;
a plurality of first connectors housing therein a first end of the optical fiber group; and
a plurality of second connectors housing therein a second end of the optical fiber group,
wherein the optical fiber group is arranged in a matrix of m rows by n columns at both the first and second ends,
wherein a first connector of the plurality of first connectors houses therein n optical fibers arranged in at least one row of the m rows,
wherein a second connector of the plurality of second connectors houses therein m optical fibers arranged in at least one column of the n columns, and
wherein the optical fiber group is arranged in the matrix of m rows by n columns, continuously from the first end to the second end.

2. The optical cross-connect component according to claim 1,
wherein the plurality of first connectors are constituted by m first connectors, and each of the first connectors houses therein n optical fibers arranged in each row, and
wherein the plurality of second connectors are constituted by n second connectors, and each of the second connectors houses therein m optical fibers arranged in each column.

3. An optical cross-connect component, comprising:
an optical fiber group having m×n optical fibers arranged in a matrix of m rows by n columns, wherein m and n each represents an integer equal to two or more;
a plurality of first connectors housing therein a first end of the optical fiber group; and
a plurality of second connectors housing therein a second end of the optical fiber group,
wherein a first connector of the plurality of first connectors houses therein n optical fibers arranged in at least one row of the m rows,
wherein a second connector of the plurality of second connectors houses therein m optical fibers arranged in at least one column of the n columns, and
wherein a pitch of the optical fibers in the at least one column and the at least one row is smaller at a center of the optical fiber group as compared to a pitch of the optical fibers at the first end and the second end of the optical fiber group.

4. The optical cross-connect component according to claim 3,
wherein the n optical fibers of the optical fiber group in each row is formed into a ribbon or the m optical fibers of the optical fiber group in each column is formed into a ribbon.

5. An optical cross-connect component, comprising:
an optical fiber group having m×n optical fibers, at least one end and an other end of the optical fiber group being arranged in a matrix of m rows×n columns, wherein m and n each represents an integer equal to or more than two;

a plurality of first connectors housing therein the one end of the optical fiber group; and a plurality of second connectors housing therein the other end of the optical fiber group, wherein the m×n optical fibers are housed in any of the plurality of first connectors, and one first connector of the plurality of first connectors collectively houses therein n optical fibers arranged in at least any one row of the m rows, wherein the m×n optical fibers are housed in any of the plurality of second connectors, and one second connector of the plurality of second connectors collectively houses therein m optical fibers arranged in at least any one column of the n columns, and wherein the optical fibers adjacent to each other are in contact with each other in the optical fiber group.

6. The optical cross-connect component according to claim 3, wherein at least one of the plurality of first connectors and at least one of the plurality of second connectors each provides therein at least two guide holes mated with guide pins for connecting with another connector.

7. The optical cross-connect component according to claim 3, wherein a diameter of the optical fibers is equal to or less than 260 µm.

8. An optical cross-connect component comprising:

an optical fiber group having m×n optical fibers, wherein m and n each represents an integer equal to or more than two;

a plurality of first connectors housing therein a first end of the optical fiber group; and a plurality of second connectors housing therein a second end of the optical fiber group, wherein the optical fiber group is arranged in a matrix of m rows by n columns at both the first and second ends, wherein a first connector of the plurality of first connectors houses therein n optical fibers arranged in at least one row of the m rows, and wherein a second connector of the plurality of second connectors houses therein m optical fibers arranged in at least one column of the n columns, wherein each of the plurality of first connectors are plate-shaped extending in a row direction, and are stacked along a column direction intersecting with the row direction, and wherein each of the plurality of second connectors are plate-shaped extending in the column direction, and are stacked along the row direction.

9. The optical cross-connect component according to claim 1, wherein the plurality of first connectors is arranged in a column oriented in a same direction as the n columns, and wherein the plurality of second connectors is arranged in a row oriented in a same direction as the m rows.

10. The optical cross-connect component according to claim 9, wherein the plurality of first connectors are stacked against each other in the column orientation, and wherein the plurality of second connectors are stacked against each other in the row orientation.

11. The optical cross-connect component according to claim 1, wherein a pitch of the optical fibers in the at least one column and the at least one row is smaller at a center of the optical fiber group as compared to a pitch of the optical fibers at the first end and the second end of the optical fiber group.

12. The optical cross-connect component according to claim 1, wherein the first connector houses two rows of the optical fibers.

13. The optical cross-connect component according to claim 1, wherein the second connector houses two columns of the optical fibers.

14. The optical cross-connect component according to claim 1, wherein optical fibers in the optical fiber group that are adjacent to each other, are in contact with each other in the optical fiber group.

15. The optical cross-connect component according to claim 14, wherein the optical fibers in the optical fiber group that are adjacent to each other, are in contact with each other at a longitudinal center of the optical fiber group.

16. The optical cross-connect component according to claim 14, wherein the optical fibers in the optical fiber group that are adjacent to each other, are separated from each other by a constant pitch at one or both of the first and second ends of the optical fiber group.

17. The optical cross-connect component according to claim 3, wherein optical fibers in the optical fiber group that are adjacent to each other, are in contact with each other at a longitudinal center of the optical fiber group, and are separated from each other by a constant pitch at one or both of the first end and the second end of the optical fiber group.

18. The optical cross-connect component according to claim 5, wherein the adjacent optical fibers are in contact with each other at a longitudinal center of the optical fiber group, and are separated from each other by a constant pitch at one or both ends of the optical fiber group.

* * * * *